Dec. 15, 1931.  W. M. CRILE  1,836,646
GLASS FORMING MACHINE
Filed Jan. 14, 1928   10 Sheets-Sheet 2

Inventor
Walter M. Crile.

By
Eccleston + Eccleston
Attorneys

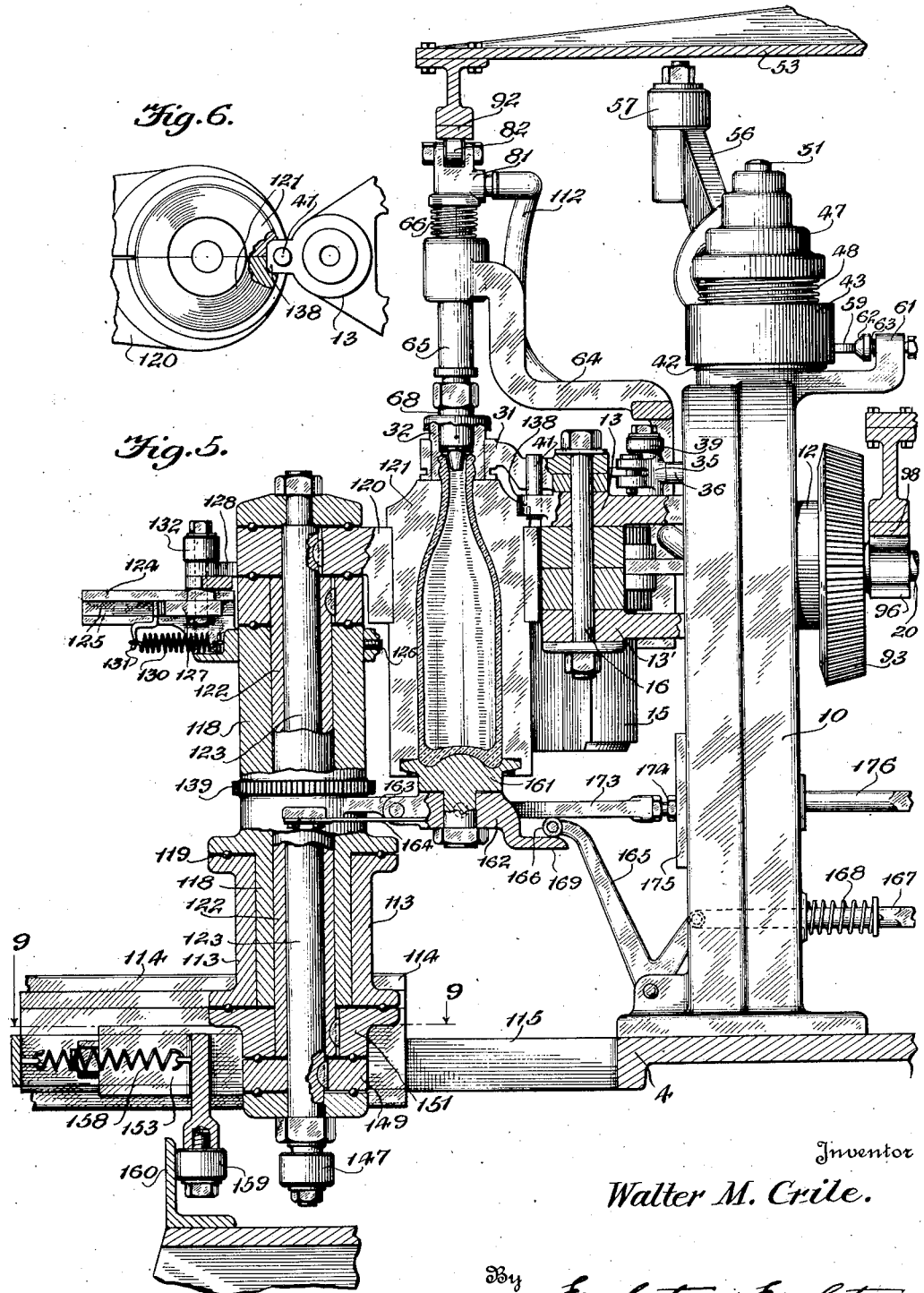

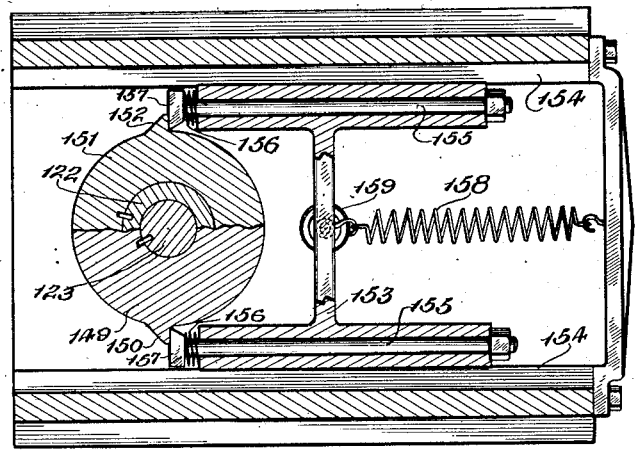

Dec. 15, 1931.   W. M. CRILE   1,836,646
GLASS FORMING MACHINE
Filed Jan. 14, 1928   10 Sheets-Sheet 7
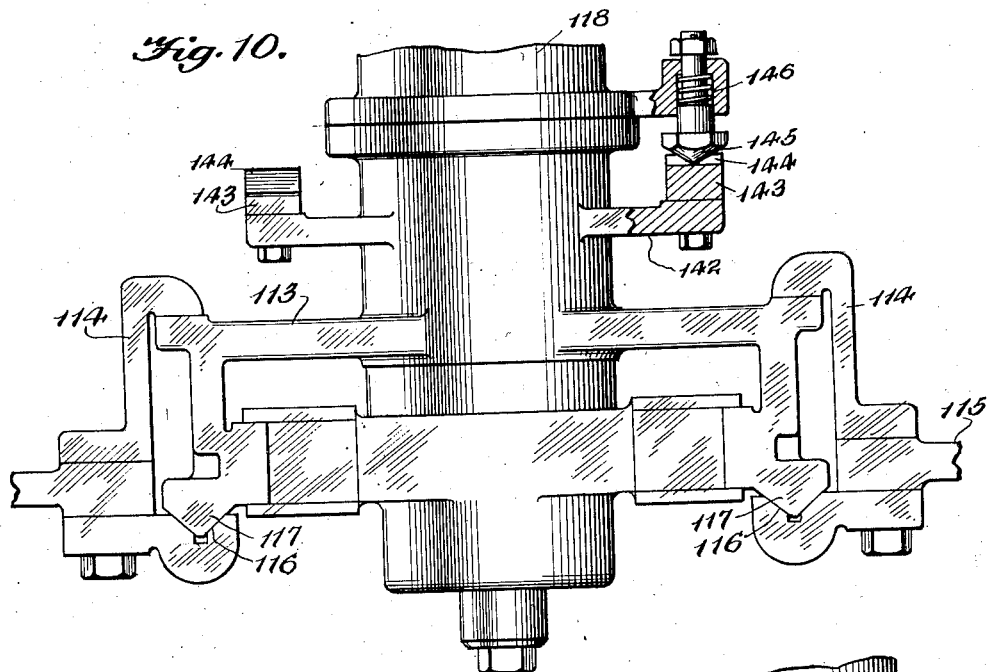
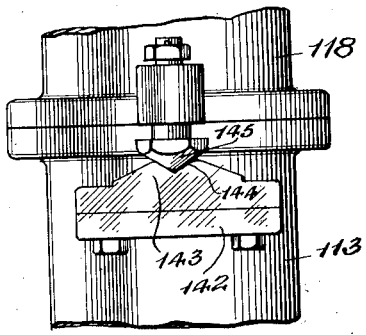
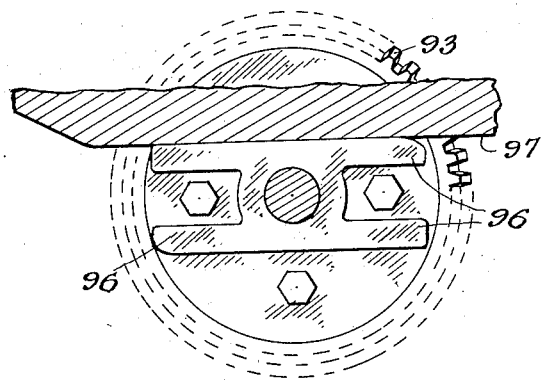
Inventor
Walter M. Crile.
By Eccleston + Eccleston
Attorney Dec. 15, 1931.  W. M. CRILE  1,836,646
GLASS FORMING MACHINE
Filed Jan. 14, 1928  10 Sheets-Sheet 8
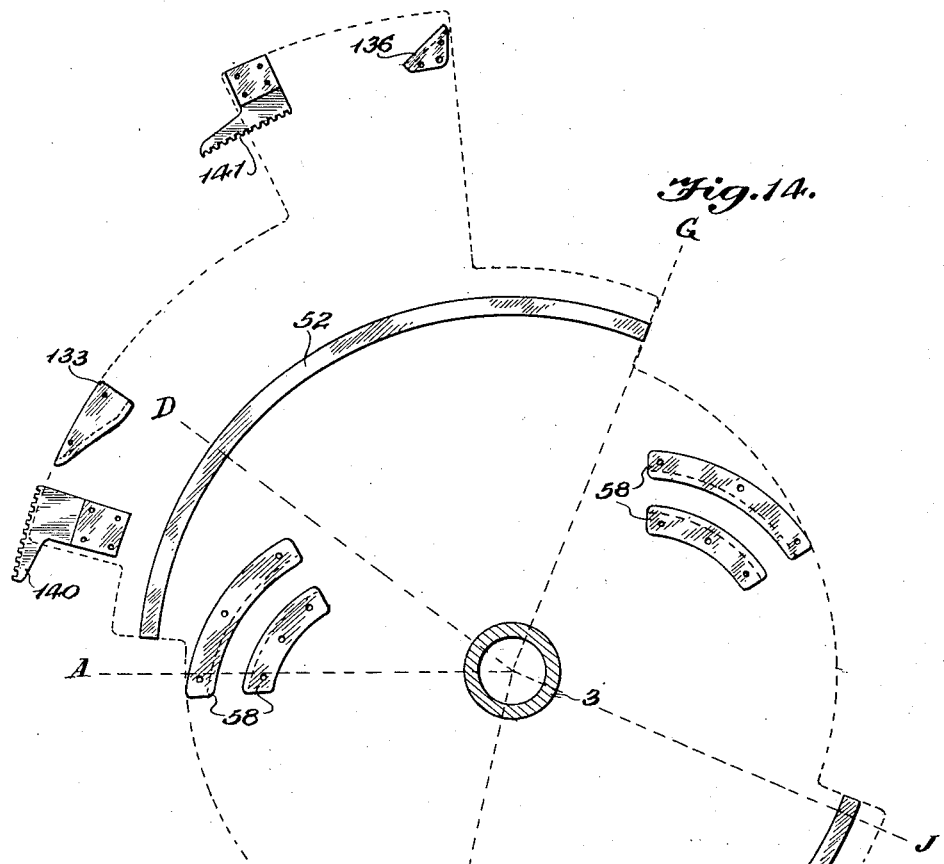
Fig. 14.
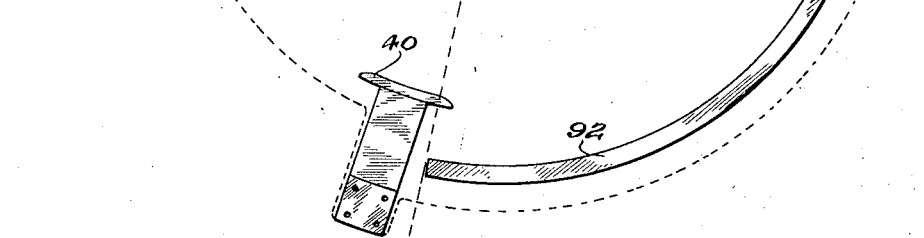
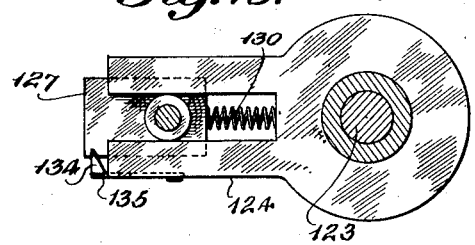
Fig. 13.
Inventor
Walter M. Crile.
By Eccleston & Eccleston
Attorney

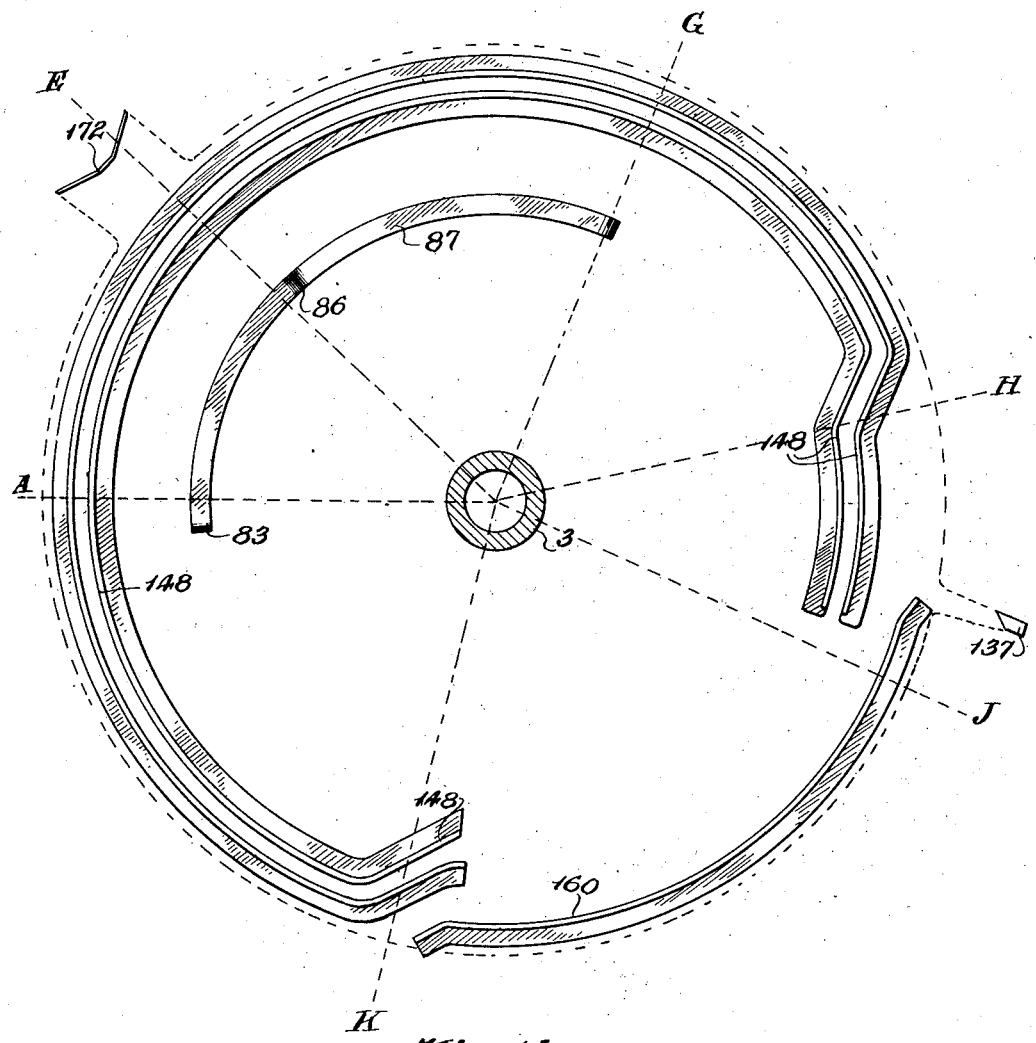

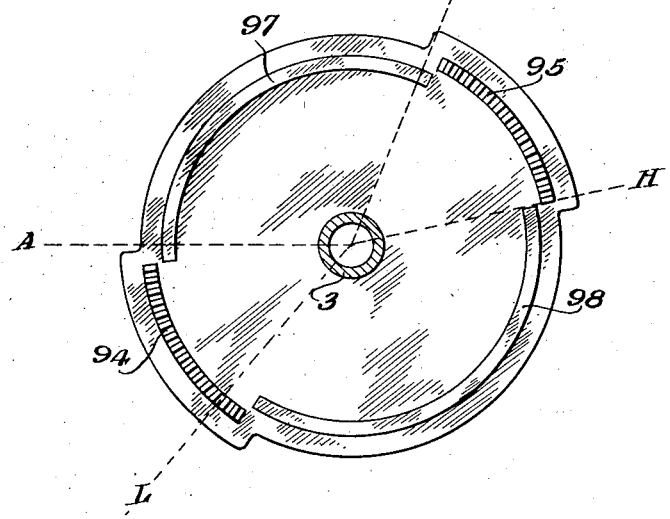
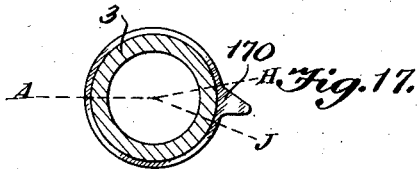
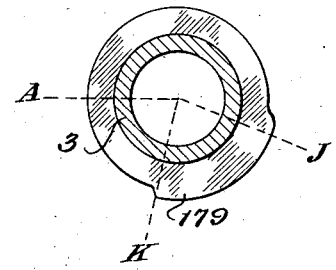
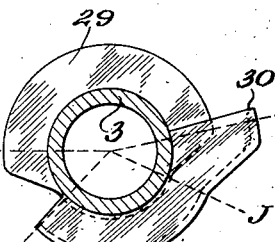
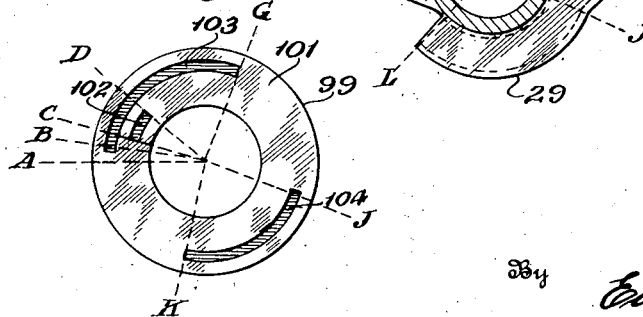

Patented Dec. 15, 1931

1,836,646

UNITED STATES PATENT OFFICE

WALTER M. CRILE, OF WASHINGTON, PENNSYLVANIA, ASSIGNOR TO WASHINGTON MOULD, MACHINE AND FOUNDRY CO., OF WASHINGTON, PENNSYLVANIA

GLASS FORMING MACHINE

Application filed January 14, 1928. Serial No. 246,748.

The invention relates to a one-table, continuously rotating entirely automatic, glass forming machine. The purpose of this invention is to provide a practical machine of this character, which is relatively simple in construction, which will operate economically and which will turn out an excellent grade of ware at an unusually high rate of production. Many important and novel features are involved in the construction disclosed herein, all of which will become apparent to those skilled in the art, from the following detailed description, when taken in connection with the accompanying drawings; in which Figure 1 is a general plan view of the machine; various parts being omitted for the sake of clearness.

Figure 5 is a vertical sectional view of one of the blow mold units, in operative blowing position.

Figure 6 is a detail plan view of the guide lug for laterally centering the blow molds.

Figure 7 is a fragmentary vertical sectional view of the plunger blowhead, and showing the plunger in cooling position.

Figure 8 is a view similar to Figure 7, but showing the plunger in blowing position.

Figure 9 is a detail horizontal sectional view taken on line 9—9 of Figure 5, and illustrating the means for clamping the blow mold in closed position.

Figure 10 is a detail end elevational view illustrating the carriage for the blow mold units, and the guideway in which the carriage is mounted.

Figure 11 is a detail elevational view of the latch for locking the blow mold after it has been rotated to its inward position, or after it has been rotated through 180° to its outward or inoperative position.

Figure 12 is a detail view of the guide lug and its cooperating cam for maintaining the blank mold in either its neck-down or neck-up position.

Figure 13 is a plan view of the reciprocable element which opens and closes the blow mold, and the spring latch for locking the element in position to retain the blow mold open.

Figure 14 is a more or less diagrammatic layout of various cams and racks for effecting certain steps in the operation of the machine.

Figure 15 is a more or less diagrammatic layout of various cams, trips, etc., for effecting other steps in the operation of the machine.

Figure 16 is a detail plan view of the racks for rotating the turnover unit which carries the blank mold and associated parts; and also the cams with which the guide lugs cooperate to maintain the blank molds in vertical position, either when they are neck-up or neck-down.

Figure 17 is a detail of the cam for causing a quick downward movement of the blow mold bottom just prior to its upward movement into engagement with the parison.

Figure 18 is a detail view of the cam for effecting the radial alignment of the blow mold bottom.

Figure 19 is a detail view of the cam for controlling the opening and closing of the blank mold; and Figure 20 is a detail view of the air control valve.

Figure 1:
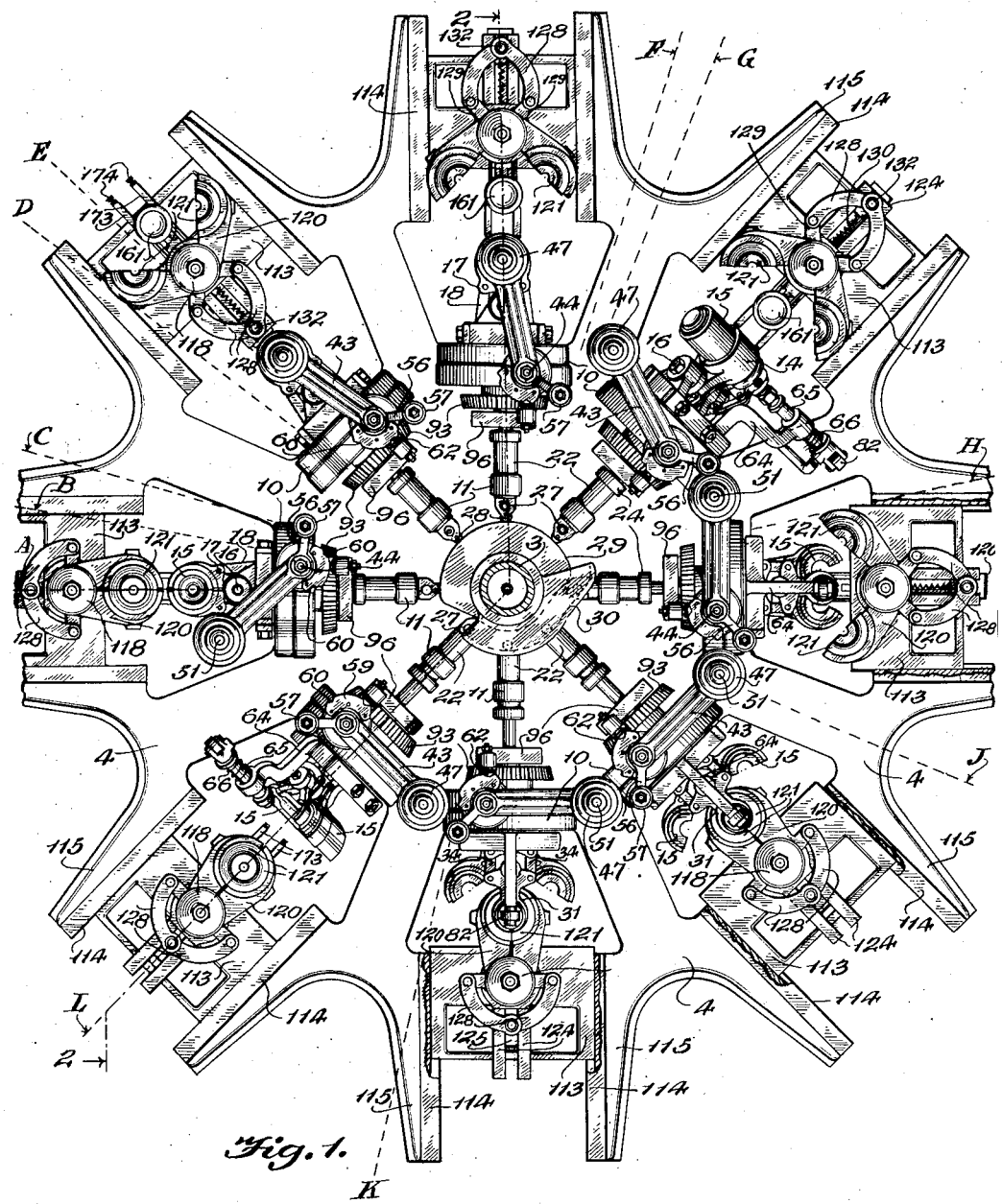

Before describing the construction of this machine, it seems advisable to give just a very general description of the mode of operation, which will be of assistance in better understanding the hereinafter described details of construction and operation.

The mold table is preferably rotated continuously, rather than step-by-step, and as the blank molds successively reach the charging station, they will be in inverted position and will receive a charge of glass, supplied thereto by any desired type of glass feeder. At the time the charge is fed to the upper end of the blank mold, the blowhead will be in position cooperating with the neck ring at the lower end of the blank mold; but the plunger will be in cooling and not blowing position. As the blank mold passes on a bottom baffle blow plate will be applied to the upper end of the blank mold, and a short blast of air will be applied therethrough to compact the glass in the neck ring. During the continued movement of the blank mold the blowhead plunger will be moved to blowing position thereby admitting blowing air to the interior of the blank to blow the parison to form. The bottom baffle blow plate and the blowhead will now be removed from the cooperative relation with the blank mold, and continued rotation of the mold table will rotate the blank mold through 180° about a horizontal axis, to bring the blank mold into neck-up position. In the meantime, the open blow mold has been rotated through 180° about a vertical axis to turn it in toward the blank mold, and the blow mold is moved inwardly radially to position to close about the parison. The continued rotation of the mold table causes the blank mold to be now opened, leaving the parison suspended from the neck ring. The blow mold bottom now swings upwardly beneath the parison, and the blow mold closes about the parison and mold bottom; an accurate alignment of the neck ring and blow mold being effected by mechanism to be described hereinfater. The blowhead is now moved into cooperative relation with the neck mold, and the article is blown to final form. The neck ring is now opened, leaving the formed article in the blow mold, and the continued rotation of the mold table causes the blow mold to be moved outwardly and be rotated through 180° about a vertical axis into a convenient delivery position; and the blank mold, blowhead and neck ring are rotated through 180° about a horizontal axis to bring the blank mold unit back to its inverted position ready to receive another charge at the charging station. And at the desired time the blow mold is opened and the blow mold bottom tilted downwardly to discharge the formed article.

A general idea of the mode of operation will be had from the foregoing brief description; and a detailed description of the construction will now be given, to be followed by a detailed description of the operation.

Numeral 1 indicates the base of the machine, which is preferably mounted on rollers 2. A fixed hollow column or post 3 is rigidly mounted on and extends upwardly from the base of the machine. And mounted to rotate on this column is the mold table 4, provided with a suitable bevel gear 5; the table riding on a ball bearing race 6. The table may be rotated by any desired means, and it may be rotated either intermittently or continuously, though as stated hereinbefore the machine is particularly adapted for continuous rotation. The preferred means for rotating the table comprises a pinion 7, which meshes with the bevel gear 5, and which is continuously rotated by a motor 8, through suitable reduction gearing 9.

For purposes of illustration I have selected an eight mold machine, but obviously the number of mold units may be either greater or less. All of the units are identical in construction and operation, and consequently a description of one of the units will be sufficient.

A complete fabricating unit comprises a blank mold unit and a blow mold unit; and I shall first describe in detail the construction of the blank mold unit, to be followed by a detailed description of the blow mold unit, and then a detailed description of the operation of the complete machine, will be given.

In the following description of one of the blank mold units, reference is to be had particularly to Figs. 1, 2, 3, 4, 5, 7 and 8. For the purpose of mounting the turnover and associated parts of the blank mold unit, the mold table carries, for each unit, a pair of stands or brackets; the main stand of each pair being indicated by the numeral 10, and its auxiliary stand being indicated by numeral 11. Suitably mounted with ball bearings in the main stand 10, is the turnover casting 12, which is adapted to be rotated about a horizontal axis, in a manner to appear hereinafter. This turnover casting 12 is provided with two spaced, parallel, outwardly extending arms 13 and 13'. Pivotally mounted between the arms 13, 13', and adjacent the ends thereof, are the blank mold clamps 14 which carry the blank mold halves 15. These clamps are pivoted about a pivot pin 16 which extends vertically through the arms 13, 13'; and it may be mentioned here that the neck mold clamps are pivotally mounted on the end of the same pivot pin 16. For opening and closing the blank mold clamps 14, they are provided with the usual lugs 17 to which are pivotally connected the forward ends of links 18; the rearward ends of the links being pivotally attached to the ends of crosshead 19 which is fixed to and reciprocated by, a rod 20. As this rod moves outwardly it will close the clamps and the blank mold carried thereby, and on the reverse movement of the rod the blank mold and clamps will be opened.

The rod 20 is slidably keyed to the turnover casting 12, as indicated by numeral 21, so that the rod will rotate with the turnover, but be capable of reciprocable movement with respect thereto, for the purpose of opening and closing the blank mold. Mounted for longitudinal sliding movement, in the upper end of the auxiliary stand 11, and in alignment with the rod 20, is a barrel member 22, which telescopically receives the rear end portion of the rod 20. A coil spring 23, within the barrel, and inwardly of the end of the rod 20, normally forces the rod forwardly. A cap 24, through which the rod passes, is threaded on the outer end of the barrel. As stated hereinbefore the barrel reciprocates back and forth, but it does not rotate; and to prevent its rotation, it is provided with a longitudinally extending keyway 25, which receives the end of the key 26 mounted in the upper end of the auxiliary stand 11. The rear end portion of the barrel member 22 carries two rollers; roller 27 being mounted on the upper side of the barrel, and the roller 28 being mounted on the rear end of the barrel. By the cooperation of these rollers with cams, the blank molds are opened and closed in a manner now to be described. The cam for opening and closing the blank mold is indicated by numeral 29, and is fixed to the stationary central column or post 3. This cam is so designed, that at the proper instant it will force the barrel 22 and rod 20 outwardly, thereby closing the blank mold. In closing the blank mold, the cam purposely overacts, and the excess motion is taken care of by the spring 23. By means of this lost-motion connection between the barrel and the rod 20, whereby overacting by the cam 29 is possible, a tight closing of the blank mold is assured, close fitting of the cam is unnecessary, and considerable wear is automatically taken care of. At the proper time the roller 27 will come into contact with the downwardly extending flange 30 of the cam 29, and this flange is designed to withdraw the barrel and plunger, thereby opening the blank mold at the proper instant. As stated hereinbefore, the rod 20 rotates about its axis with the turnover, but the barrel does not rotate about its axis, and has only a longitudinal movement; so it will be apparent that the rollers 27 and 28 always remain properly positioned for cooperation with the cam 29. The time at which the blank mold is opened and closed, will be described hereinafter in connection with the detailed description of the operation of the machine.

The neck ring clamps are also carried by the turnover casting 12, so that the blank mold and neck ring will rotate as a unit about a horizontal axis. The neck mold clamps are indicated by numeral 31, and as usual these clamps carry the neck mold halves 32. The clamps are pivotally mounted on the pivot pin 16, which extends through the arms 13—13′ of the turnover casting 12, and which pin is also the pivot of the blank mold clamps. The neck mold clamps are provided with the usual lugs 33, to which the outer ends of links 34 are pivotally connected, the inner ends of the links being pivotally attached to crosshead 35 which rides on the arm 13, and which has a rearwardly extending stem 36 projecting into a recess 37 in the turnover casting 12. A coil spring 38 is mounted in the recess, inwardly of the stem 36, and thus the stem is normally forced outwardly to close the neck mold. The crosshead 35 carries a roller 39 which, at the proper instant, engages a cam 40 (Fig. 14), whereby the crosshead is moved inwardly against the pressure of the spring 38, whereby the neck mold is opened. It is only necessary to maintain the neck mold open for an instant, and consequently in the specific construction illustrated herein the roller 39 quickly rides off the cam 40, whereupon the spring quickly snaps the neck mold closed. It is necessary that accurate alignment of the neck mold be maintained, and for that purpose there is provided an index pin 41 fixed in a suitable opening adjacent the end of the arm 13 carried by the turnover casting 12. The neck mold clamps, in closing, fit about this index pin, and thereby accurately align the neck mold in true central position. It will be understood, of course, that the blank mold closes about or embraces a portion of the neck mold, and consequently the neck mold itself constitutes an index for the true centering of the blank mold. It will also be understood that in securing this alignment of the parts, there is sufficient looseness in the crosshead guides to prevent any straining of parts.

As stated hereinbefore, the blank mold is in neck-down or inverted position at the time the charge or gather is fed thereto through its upper enlarged end; and as the first step is to compact the glass in the neck mold, I shall first describe the bottom baffle blow plate which is applied to the upper end of the inverted blank mold, for blowing the glass down, in the compacting operation. In the first place, it should be mentioned that the bottom baffle blow plate does not rotate with the turnover, and therefore it is mounted entirely independent thereof. On the other hand, the blowhead does rotate with the turnover, and is mounted thereon, so that the blank mold, neck ring, and blowhead rotate as a unit, about a horizontal axis, as will appear hereinafter.

The bottom baffle blow plate, which for the sake of brevity will be termed the bottom plate, is indicated by numeral 42, and is mounted for slight vertical sliding movement in the end of an arm 43. This arm is mounted for oscillating movement on a pivot pin 44 which is carried by the main stand 10. The bottom plate is hollowed to form an air chamber, and mounted in the bottom thereof is a check valve 45, which is normally closed by a light spring 46. When air is supplied to the chamber the pressure thereof will unseat the check valve and permit the air to escape therethrough to the upper end of the inverted blank mold. The means for supplying air to the bottom blow plate will be described hereinafter in connection with the description of the means for supplying air to the blowhead. A cap 47 is threaded on the upper end of the bottom plate, and a coil spring 48 surrounds the bottom plate between the upper side of the bracket 43 and the lower edge of the cap 47, so that the bottom plate is normally forced upward in the bracket; the upward movement being limited by an outwardly extending flange 49 on the lower end of the bottom plate. Mounted in the upper end of the cap 47, and normally projected upwardly by a relatively heavy spring 50, is a pin 51 which is adapted to engage a cam 52 carried by a plate 53 fixed to the column 3, and thereby force the bottom plate downwardly into engagement with the upwardly presented bottom of the blank mold. Of course, a roller may be substituted for the pin, if desired, for the purpose of eliminating the sliding contact and thereby reducing friction.

It will be noted that the bottom plate has a countersunk portion provided with a chamfered edge 54 which fits over a similar projection 55 on the bottom of the blank mold, so that the bottom plate, when lowered, will be accurately fitted and centered on the blank mold; the bottom plate turning slightly about its pivot pin, if necessary, to give true alignment. This takes care of any inaccuracy in alignment to the right and left, but it must be accurately fitted for location in and out from the center of the machine. The bottom plate must be oscillated back and forth in a horizontal plane, between its operative and inoperative position; for obviously it must be moved out of the way after the parison is formed, so that the blank mold may be rotated to neckup position, and it must remain out of the way until the next charge has been fed to the blank mold. For effecting this oscillating movement the arm 43 is provided with an outwardly and upwardly extending member 56, which carries at its end a roller 57 adapted to engage cams 58 fixed to the plate 53; there being two of these cams, one for swinging the bottom plate to operative position, and the other to swing it to inoperative position. A diagrammatic layout of the two cams 58 and the cam 52, is shown in Fig. 14. For the purpose of locking the bottom plate in its inoperative position, and in approximately its operative position, the hub of the arm carries an arcuate plate 59, the periphery of which is provided with two notches 60; and slidably mounted in a bracket 61, on the main stand 10, is a latch 62 normally pressed in the direction of the arcuate plate by the spring 63. It is needless to say that the notches 60 are so positioned in the plate 59, that when the bottom plate is in its operative position one of the notches will be in position to be engaged by the latch 62, so that it is maintained in this position after the cam 58 ceases to function; and likewise when the bottom plate is swung to inoperative position, the other notch will be in position to be engaged by the spring latch. Of course, only a light spring is employed on the latch 62, so that the latch will be readily moved out of the notch, when the cams 58 exert pressure on the roller 57.

Just as the blank mold passes beyond the point where it receives its charge, the roller 57 will ride into engagement with one of the cams 58; the roller having been retained in alignment with the cam by means of the spring latch 62 engaging one of the notches 60 in the plate 59. The cam 58 acting on the roller 57 will by a very slight pressure unseat the spring latch 62 and swing the arm 43 to position where the bottom plate 42 will be in substantial alignment with the blank mold. The roller 57 now rides free of the cam 58, and the bottom plate is retained in its position in alignment with the blank mold by means of the spring latch 62 engaging the other notch 60 in the plate 59. In the meantime, just the instant the bottom plate came into alignment with the blank mold, the pin 51 (or roller) came into engagement with the cam 52, whereby the bottom plate is forced downwardly into operative engagement with the blank mold. In this downward movement the bottom plate will be accurately seated on the blank mold by reason of the chamfered edge 54 of the bottom plate engaging the projection 55 on the mold bottom. In this centering of the bottom plate, of course the spring latch 62 will permit the arm 42 to turn slightly about its pivot pin 44. It will be noted that the cam 52 need not be closely fitted, for it will preferably overact, and the spring 50 will provide the necessary lost motion; and of course this spring will be of sufficient strength to resist the pressure of the air applied to the blank mold. The bottom plate being in position, a short blast of air is supplied to the chamber of the bottom plate, in a manner to be described hereinafter; and this blast will unseat the check valve 45, and enter the upper end of the blank mold, thereby forcing the glass downward and compacting it in the neck ring. It will be understood, of course, that when the charge of glass was fed to the blank mold, the blowhead plunger was in its cooling position in the neck mold. After the compacting operation the bottom plate will be retained in place, and the blowhead plunger will be moved to its blowing position and air pressure will be admitted to the interior of the blank to blow the parison to more or less hollow form. In this blowing of the parison, the bottom plate 42 will function as a baffle against which the glass is blown; the compacting blast through the bottom plate having been dissipated in the meantime. After the blowing of the parison is completed, the pin 51 rides free of the cam 52, whereupon the spring 48 will force bottom plate upwardly free of the blank mold; and then the roller 57 will engage the other cam 58 to swing the arm 43 and bottom plate 42 laterally, out of the way, so that the blank mold may be rotated to neck-up position. When the bottom plate is swung to its inoperative position, the roller 57 rides free of the cam 58, and the bottom plate is retained in its inoperative position by the spring latch 62 engaging the appropriate notch in the plate 59; and the bottom plate will remain in this inoperative position until it is again brought into play just beyond the point where the charge is fed to the blank mold.

The turnover unit comprises the blank mold, the neck mold, and the plunger blowhead. The blank mold and the means for opening and closing the same, and the neck mold and the means for opening and closing the same, have already been described; and I shall now describe the plunger blowhead and the means for operating it, and then will follow a description of the means for rotating the turnover.

Numeral 64 indicates a bracket which is fixed to the turnover casting 12, to rotate therewith; and slidably mounted for vertical movement in this bracket is a hollow rod 65; the rod being normally forced in a direction away from the neck mold by means of a coil spring 66 which is mounted on the rod between the bracket and the remote end of the rod. The rod will be held against rotation by means of a key and keyway connection (not shown) between the bracket and the rod. The rod is provided with a passage 67 for the blowing air, which is supplied thereto in a manner to be described hereinafter. In the detail description of the combined plunger and blowhead, reference is to be had particularly to Figs. 7 and 8. Attached to the end of the rod 65 nearest the neck mold, is the combined blowhead and plunger, referred to generally by the numeral 68. This member 68 is secured to the rod 65 in any desired manner, as for example, by the flanged nipple 69 and the flanged collar 70; the nipple being provided with a passage 71 which aligns with and forms a continuation of the passage 67 in the rod 65. The plunger is indicated by numeral 72, and the nose thereof, which forms the initial opening in the blank, is referred to by numeral 73. Extending through the plunger to a point adjacent the end of the nose, is a passage 74, which aligns with the passage in the nipple 69, but which is of somewhat greater diameter than the nipple passage. A tubular member 75, of such diameter as to be slightly spaced from the wall of the passage 74, projects into this passage and extends to a point very near the end thereof. This tubular member is maintained centrally positioned with respect to the passage 74, by means of its flanged end 76 which fits in a recess 77 in the remote end of the plunger; and this flange projects slightly beyond the end of the plunger, so that it is firmly secured in place by the clamping action of the collar 70 and nipple 69, as clearly illustrated in Figs. 7 and 8. The passage extending through the member 75 is indicated by numeral 78, and this passage aligns with the passage in the nipple 69 and in the rod 65. Formed integral with or attached to the plunger 72, is a cap 79 having a guide flange 80. The inner edge of this guide flange is slightly rounded to cooperate with the slightly rounded edge of the neck mold, whereby the plunger is smoothly guided in its entrance into the neck mold. And it may be mentioned at this point that the plunger and the guide flange of the cap, also constitute means for firmly positioning the combined blowhead and plunger with respect to the neck mold and blank mold, thereby taking care of any looseness in the mounting of the neck mold and blank mold.

Attached to the remote end of the rod 65 is an elbow member 81, and to this elbow member is attached a pipe for supplying cooling and blowing air, in a manner to appear hereinafter. This elbow member carries a roller 82 which is adapted to engage a cam 83 (Figs. 2, 3 and 15) which first moves the plunger to cooling position, and a little later permits the plunger to be moved to blowing position. The spring 66 normally holds the combined plunger and blowhead in its inoperative position, but before the blank mold reaches the charging station the roller 82 will ride up on the cam 83, whereby the plunger blowhead will be moved upward and be projected into the neck mold, so that it is ready for the charge of glass to be introduced and be compacted down in the neck ring around the end of the plunger nose, so that the neck of the bottle or other article, and the initial opening therein, are formed. During this time the plunger is in its cooling position; and for an understanding of the mode of operation when in cooling position, reference is to be had to Fig. 7. When in this position the air will pass upwardly through the aligned passages 67, 71 and 78, into the nose of the plunger, and then turn downwardly passing along the circumferential space between the exterior of the tubular member 75 and the wall of the passage 74, until it reaches the ports 84 in the plunger, which ports, in the present position of the plunger, are in register with ports 85 in the neck mold, and through which the air will escape. Thus the plunger will be cooled while the compacting operation is being performed, but no air will escape from the plunger into the interior of the blank. By the time the compacting operation has been performed the roller 82 will have reached a downwardly inclined step 86 (Fig. 15) leading to a slightly lower level of the cam 83; this lower portion of the cam being indicated by numeral 87. When this portion of the cam 83 is reached, the spring 66 will force the plunger blowhead slightly downward in accordance with the step in the cam; and by this slight downward movement, the plunger blowhead is moved from cooling position to blowing position. For an understanding of the mode of operation of this mechanism, when in its blowing position, reference is to be had to Fig. 8. By reference to this figure it will be noted that ports 84 and 85 are no longer in registering position; and it will also be noted that ports 88 in the plunger are now in open position so that the blowing air will escape through these ports into the interior of the blank to blow the parison to form; the bottom plate 42 functioning as a baffle against which the glass is blown. In connection with the ports 88 it will be noticed that they are located in a reduced portion 89 of the plunger, which reduced portion fits into a corresponding portion 90 of the neck mold, when the plunger is in cooling position, so that the escape of air through the ports 88 is shut off. The plunger and neck mold are correspondingly shouldered, to form the cooperating parts above described; but these shoulders preferably do not contact, as clearly illustrated in Fig. 7. When the plunger is moved to blowing position the ports 88 and the reduced portion 89 will be clear of the corresponding portion 90 of the neck mold, thereby leaving a free passage 91 around the plunger, through which the blowing air passes to the interior of the blank.

After the forming of the parison has been completed, the bottom plate 42 is moved upwardly and swung aside clear of the blank mold in the manner hereinafter described; and the roller 82 rides off the cam 83, whereby the spring 66 functions to force the combined blowhead and plunger downwardly clear of the neck mold; and the turnover unit comprising the blank mold, neck mold, and plunger blowhead, is now ready to be rotated through 180° to bring these parts into neck-up position. After the parts have been brought to neck-up position, and the parison has been enclosed within the blow mold, the roller 82 will ride on the cam 92 (Figs. 5 and 14) whereby the plunger blowhead will be moved downwardly into the neck mold, in blowing position, and the parison will be blown to the final form of the article being manufactured.

Having described the various elements that are carried by the turnover casting 12, I shall now describe the means for rotating the turnover, and the means for retaining the turnover in position when it is not being rotated; reference being had particularly to Figs. 1, 3, 4, 5, 12 and 16. Fixed to the turnover casting 12 is a bevel gear 93, which is adapted to engage, during the revolution of the mold table, the two racks 94 and 95, each of these racks being so designed that it will rotate the turnover through 180°. Also fixed to the turnover casting is a guide lug 96, which is adapted to engage cams 97 or 98 when the turnover is not in the process of being rotated. The relation which the guide lug 96 bears to one of the cams 97, 98, is illustrated in detail in Fig. 12. In operation, the blank mold unit will be in inverted position when it reaches the charging position, the turnover casting being maintained in this position by reason of the guide lug 96 engaging the cam 97. And it may be mentioned here that there is a slight looseness between the guide lug and the cams 97 and 98, so as to allow a slight freedom of movement of the blank mold unit for purposes of alignment.

After the parison has been formed and the blank mold, neck mold, and plunger blowhead are ready to be turned to neck-up position, the guide lug 96 will ride free of the cam 97, and at the same time the bevel gear 93 will engage the rack 95, whereby the turnover unit will be rotated through 180°, bringing the blank mold unit to neck-up position. And just as the bevel gear passes out of engagement with the rack 95, the guide lug 96 will come into engagement with the cam 98 whereby the unit will be maintained in approximately its vertical position. The blow mold now closes about the parison, and the parison is blown to the final form of the article. As soon as the blowing is completed and the blank mold unit is ready to be rotated to inverted position, the guide lug 96 will ride free of the cam 98, and at the same time the bevel gear 93 will engage the rack 94, whereby the turnover and the blank mold unit carried thereby, will be rotated through 180° to bring the blank mold, neck mold and plunger blowhead to inverted position, ready for the next charge of glass. And, of course, just as the gear 93 passes out of mesh with the rack 94, the guide lug 96 will engage the cam 97, thereby maintaining the parts in this position until the point is again reached where the turnover is rotated to bring the blank mold unit into neck-up position.

All that remains to be described in connection with the construction of the blank mold unit, is the means for controlling and supplying the air to the bottom baffle blow plate 42 and to the plunger blowhead. Such construction will now be described; it being understood, of course, that any desired means may be employed in place of the present preferred means illustrated herein.

Figure 2:
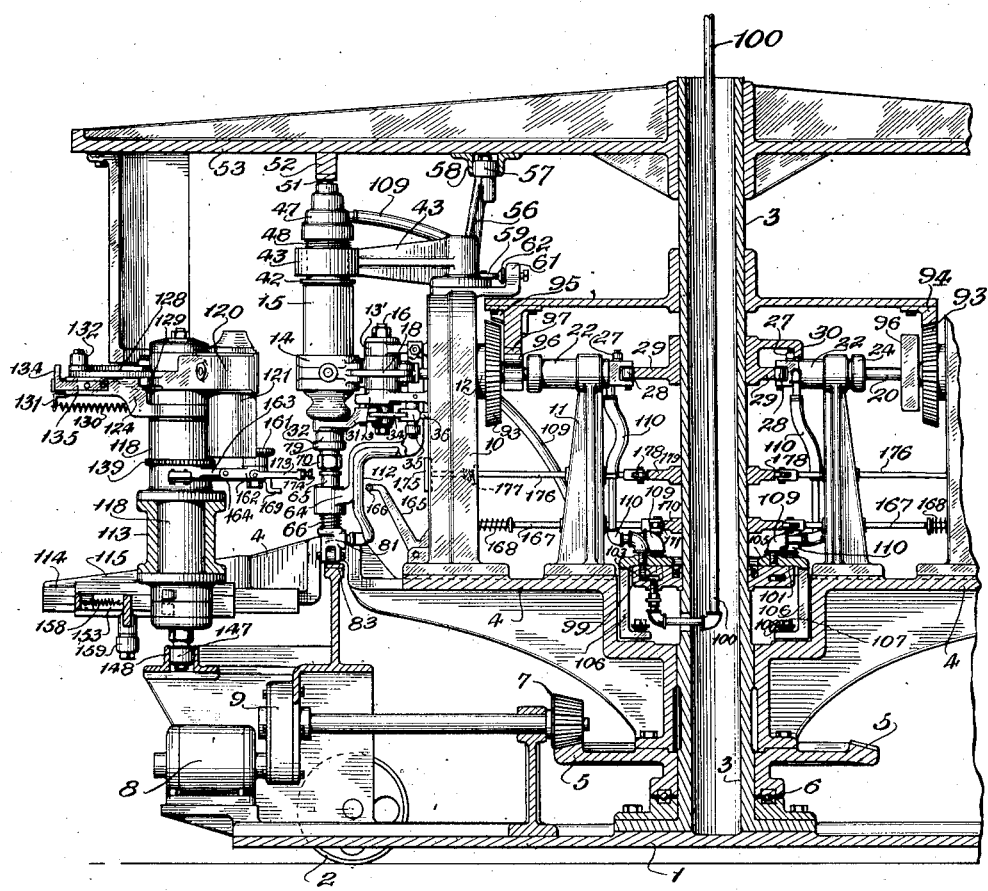
Figure 2 is a vertical sectional view through a portion of the machine taken on line 2—2 of Fig. 1; and illustrating the means for rotating the turnover; the control of the compacting and blowing air; the means for rotating the mold table, etc.
Figure 3:
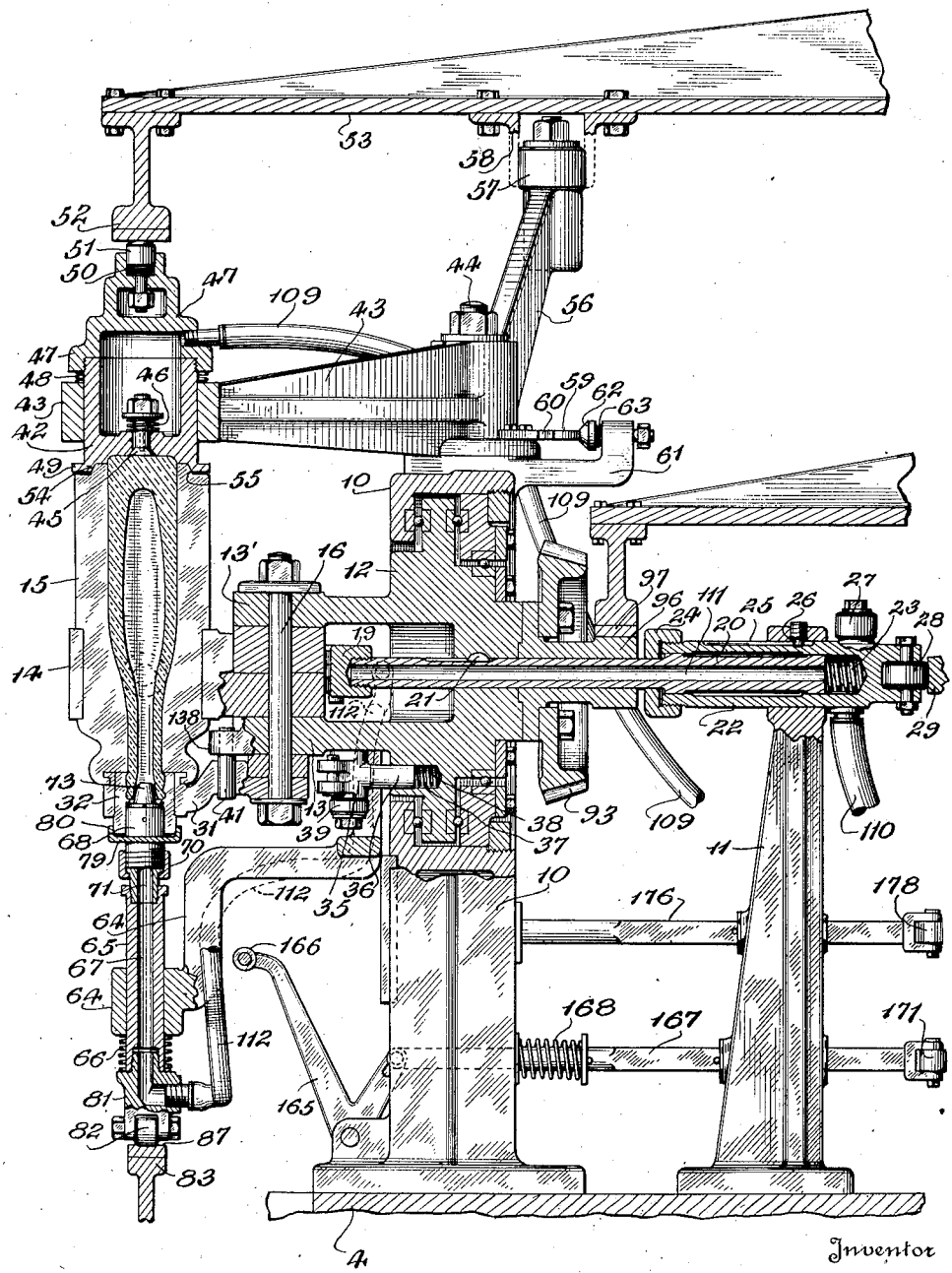
Figure 3 is a vertical sectional view of one of the blank mold units, showing the bottom baffle blow plate in place on the upper end of the inverted blank mold, and the plunger blow head in cooperative blowing relation with the neck ring.
Figure 4:
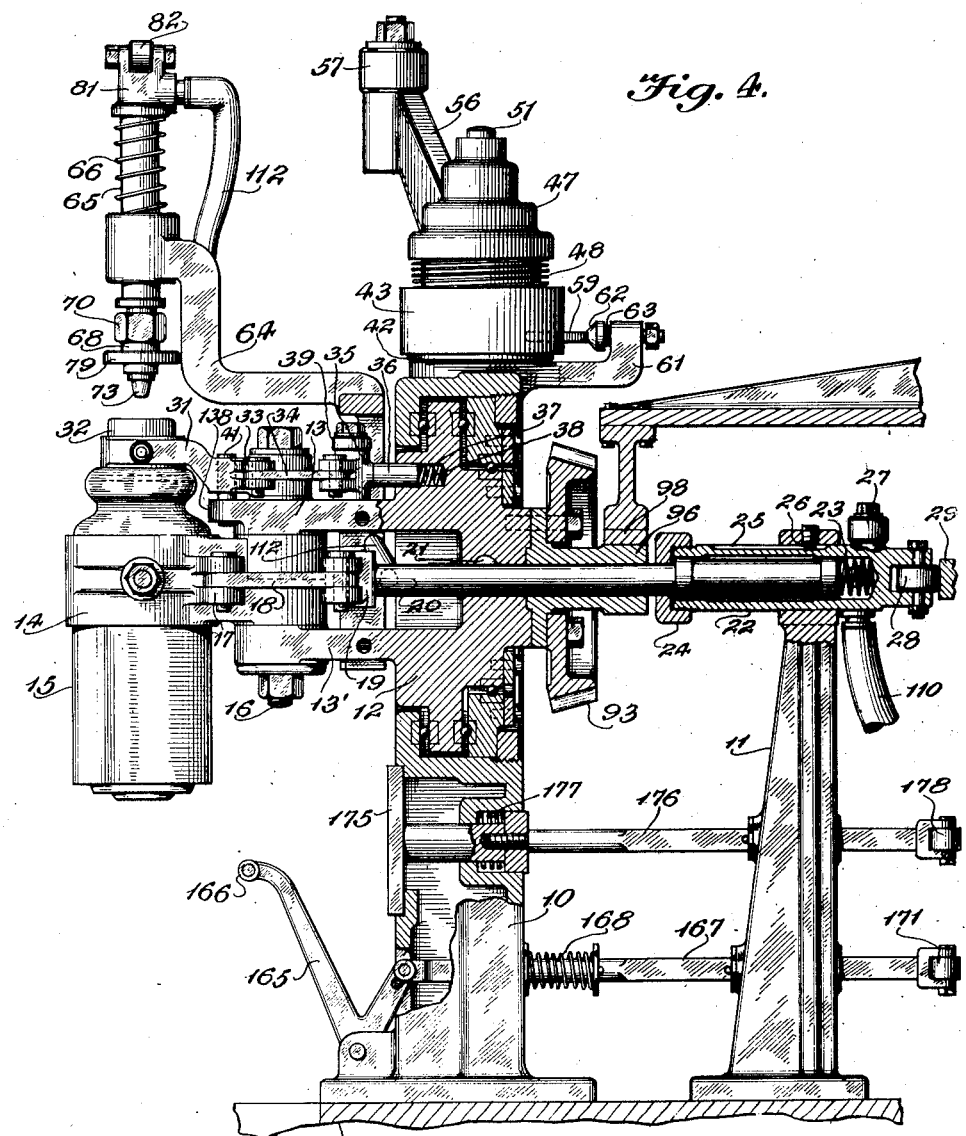
Figure 4 is a side elevational view of one of the blank mold units (parts being in section) after it has been turned through 180° from the position shown in Fig. 3; the parts being in such position that the blank mold is about to be opened, leaving the parison suspended from the neck ring, whereupon the blow mold will instantly close about the parison.

Referring particularly to Fig. 2, numeral 99 indicates an air manifold which is concentrically fixed on the stationary column 3, and air under pressure is constantly supplied thereto by a pipe 100, which connects with any source of supply, and leads downwardly through the column 3 to the manifold. Now referring to Figure 20, it will be noted that the face 101 of the manifold is provided with a short concentric slot 102, which provides for the short blast of air to the bottom plate 42 for the compacting operation; and two long concentric slots 103 and 104. The slot 103 permits the compressed air to pass to the inverted plunger blowhead for cooling the plunger during the compacting operation, and for blowing the parison; while the slot 104 permits the compressed air to pass to the plunger blowhead when the blowhead is in position for blowing the parison to final form in the blow mold. Thus the air control means is common to both the blank mold work and the blow mold work.

A valve plate 105 is fitted to rotate on the face 101 of the manifold 100. Of course, this valve plate rotates with the mold table; and for this purpose the plate is provided with depending arms 106 through which pass bolts 107 secured to a depressed portion of the mold table 4. It is essential that the valve plate be maintained in close fitting relation with the face of the manifold, and to accomplish this springs 108 are mounted on the bolts 107, to apply a continuous downward pressure on the plate as it rotates on the manifold.

As the bottom baffle blow plates merely oscillate about a vertical axis, and do not rotate with the turnover about a horizontal axis, a very simple air connection is possible. All that is necessary is a flexible hose 109, for each of the bottom plates; each of these hoses having one end connected with the air chamber of the bottom baffle blow plate 42, and the other end connected with the valve plate 105, in position to successively align with the short slot 102 of the manifold. So that just after each blank mold passes the charging position, the air line 109 of its bottom baffle blow plate will come into register with the slot 102, whereby a short blast of air will be admitted to the bottom plate, and this blast will unseat the check valve 45 and enter the blank mold, to compact the glass down in the neck mold.

The air connections for the plunger blowhead are slightly more complex, as the blowhead rotates about a horiontal axis with the turnover. As described hereinbefore, the rod 20, which opens and closes the blank mold, rotates with the turnover, but its inner end is telescopically arranged in the barrel 22, which reciprocates but does not rotate. Therefore, in the preferred construction I supply the air for the blowheads to these non-rotatable barrels. Numeral 110 indicates a flexible hose for each blowhead, and having one end connected to the barrel and the other end connected with the valve plate 105, in position to align with the slots 103 and 104. The air thus introduced into the barrel 22 will enter the passage 111 in the rod 20. A flexible piping 112 leads from the opposite end of the rod 20 to the elbow member 81 attached to the lower end of the rod 65 which carries the plunger blowhead. Thus as each blank mold successively reaches the position where a charge is to be fed thereto, the pipe 110 of that unit will be in register with the slot 103, so that air will be supplied through the pipe 110, barrel 22, passage 111 in rod 20, and thence through pipe 112 to the blowhead; it being understood that at this time the plunger is in cooling position. At the proper instant the plunger will be moved from cooling position to blowing position, and the pipe 110 will still be in register with slot 103, so that air will pass to the plunger blowhead for the parison blowing operation. When this has been completed, the pipe 110 will pass out of register with the slot 103; and after the parison has been turned to neck-up position, and is ready for final blowing in the blow mold, the pipe 110 will come into register with the slot 104, whereby the final blowing operation is performed.

Having completed the description of the blank mold, neck mold, bottom plate, combined plunger and blowhead, turnover, air control, and the mechanism for operating all of such parts, I shall now proceed with the description of one of the blow mold units.

There is, of course, a blow mold unit for each blank mold unit; and it may be mentioned here, that in this forming machine the blow mold units are moved radially toward and away from the blank mold units, and also that the blow mold units are preferably, though not necessarily, rotated 180° about a vertical axis in order to place the finished ware in a desirable position for delivery.

Numeral 113 refers to a carriage which is mounted for radial reciprocating movement in a trackway 114 fixed to the arms 115 projecting from the mold table. The trackway is preferably provided with V-shaped grooves 116 to receive the tapered rails 117 of the carriage. A vertical turret 118 is mounted in the carriage 113, and is adapted to rotate therein; the carriage itself being reciprocable but non-rotatable, though of course, the whole blow mold unit revolves with the mold table. A ball bearing race 119 is provided between the turret and its carriage; and it may be mentioned here that ball bearings are provided throughout the machine, and it will therefore be unnecessary to mention their use at various points. The blow mold clamps are indicated by numeral 120, and these clamps carry the blow mold halves 121. One of the clamps 120 is keyed to a sleeve 122 which extends downwardly through the turret and carriage; and the other clamp 120 is keyed to a shaft 123 which extends downwardly through the sleeve 122. Before completing the description of the construction and function of these parts, I will first describe the means for opening and closing the blow mold. A guide bracket 124 having guideways 125 therein, is attached to the turret 118, by any desired means, such as set screws 126. A crosshead 127 is mounted to reciprocate in these guideways, and pivotally connected to the crosshead by the usual pivot pin are links 128; the opposite ends of the links being pivotally attached to lugs 129 on the blow mold clamps. A coil spring 130 has one end connected to the guide bracket 124, and its opposite end connected to a pin 131 depending from the crosshead 127; the arrangement being such that when the coil spring is free to act it will close the blow mold. The pivot pin of the blow mold clamps also carries a roller 132 which will engage a cam 133 to open the blow mold, after the blow mold has been moved radially outward, has been rotated about a vertical axis to its outside or delivery position, and when the ware is ready to be delivered. The layout of the cam 133 is illustrated in Fig. 14. When the blow mold is opened, a latch 134 (Fig. 13) carried by a leaf spring 135 attached to the guide bracket 124, will spring into an appropriate notch in the crosshead 127, and thus maintain the mold open. After the finished article has been delivered, the blow mold will be rotated 180° about a vertical axis, in a manner to be described hereinafter, and if by chance the spring latch 134 should release the crosshead 127 thereby permitting the spring 130 to close the blow mold, it will be opened by means of the roller 132 engaging cam 136. The layout of this cam is illustrated in Fig. 14. When the unit has been carried by the mold table to the point where the blow mold is to come into action to receive the parison, the spring latch 134 will engage a fixed tripping finger 137 (Fig. 15) which will release the latch from the crosshead 127, whereby the spring 130 will close the blow mold. Of course the blow mold does not close around the neck mold, as the neck mold must be opened first; and it is therefore necessary that means be provided for accurately aligning the neck mold and blow mold. For this purpose I provide an index lug 138, which is fixed to or forms an integral part of the arm 13 which extends outwardly from the turnover casting. Each of the blow mold halves is provided with a suitable notch about one-half the width of the index lug, so that when the mold is closed these notches will fit about the index lug. A detail of this construction is shown in Fig. 6. The above described means will accurately align the blow mold, right and left looking toward the center of the machine; and the means for centering the mold radially will be described hereinafter.

While I have described the blow mold as being maintained in open position after being opened by cam 133, it is to be understood that this step is not absolutely necessary as the blow mold may be allowed to close before being again rotated to its inwardly facing position. Under these circumstances the blow mold would then be reopened by the cam 136 and maintained open by latch 134 until released by trip 137. Of course, under such circumstances, the cam 172 for tripping the blow mold bottom downwardly for discharging the ware, will be arranged to function practically simultaneously with the cam 133 for opening the blow mold; and this cam 133 will be so designed to retain the blow mold open until the ware is discharged.

The means for opening and closing the blow mold, having been described I will now describe the means for rotating the blow molds about a vertical axis. The turret 118 carries the blow mold bottom, and also carries the guide bracket 124 in which rides the crosshead for opening and closing the blow mold. Consequently when the turret is rotated the blow mold and blow mold bottom will be rotated therewith. As will appear hereinafter, the blow mold is never rotated except when it is in its withdrawn or outer position. A gear 139 is formed integral with or attached to the turret 118, and during the revolution of the mold table this gear will mesh with a rack 140, which will rotate the turret, blow mold and blow mold bottom, through 180° to bring the blow mold and bottom into position where the article may be easily delivered. When the article has been delivered, the gear 139 will engage a rack 141, which will cause the turret to rotate in the opposite direction 180° to bring the blow mold and mold bottom back into position where they may be moved, at the proper instant, radially inward into cooperative relation with the neck mold. The turret and elements carried thereby are retained in either their inner or outer position of rotation, by means of a spring latch illustrated in Figs. 10 and 11. A flange 142 projects laterally from the carriage 113, and bolted to this flange are two members 143, each provided with a notch 144; the two members 143 being on opposite sides of the turret. The turret 118 carries a latch 145 which is normally pressed downward by a coil spring 146; so that when the turret and blow mold are rotated outward the latch 145 will seat in its appropriate notch 144, the instant the gear 139 is out of mesh with the rack 140; thereby releasably retaining the blow mold in its outer position of rotation. In like manner, when the gear 139 meshes with the rack 141, the latch will be forced out of its notch, the turret and blow mold will be rotated through 180° to its inner position of rotation, and the instant the gear leaves the rack 141, the latch 145 will be in position to spring into the other notch 144, thereby retaining the turret, the blow mold, the blow mold bottom, etc., in their inner position of rotation, until the gear again meshes with the rack 140. It will be understood, of course, that this spring latch will provide sufficient play to permit proper alignment of the molds.

The means for moving the blow molds back and forth radially, will now be described. As stated hereinbefore, the blow mold unit which is mounted on a carriage 113 is adapted to move back and forth radially in the trackway 114. For this purpose the shaft 123, which carries one of the blow mold clamps, and which shaft extends downwardly through the turret and the carriage, is provided at its lower end with a roller 147. This roller is adapted to cooperate with a cam 148. This cam is shown in Fig. 2, and the layout of the cam is shown in Fig. 15; the cam being so designed that it will, at the proper instant, move the blow mold unit radially away from the blank mold unit, and retain it in this position until it is time for the blow mold to again come into action, whereupon it will be moved radially back into position to cooperate with the neck mold, in the final blowing of the article. While the blow mold is in its withdrawn position it is rotated in the manner hereinbefore described, and after it is moved into position to cooperate with the neck mold it will be closed in the manner also described hereinbefore. But after the blow mold has been closed it is essential that it be clamped tightly together during the blowing action, and I shall now describe the means by which this is accomplished, without employing cylinders such as are now commonly used for that purpose. The shaft 123, to the upper end of which one of the blow mold clamps is keyed, has keyed to its lower end a collar 149 provided with a laterally extending lug 150; and the sleeve 122, to the upper end of which the other blow mold clamp is keyed, has keyed to its lower end a collar 151 provided with a laterally extending lug 152. This construction is illustrated in Figs. 5 and 9. All of this structure is mounted on the carriage 113 which reciprocates radially in the trackway 114. A slide 153 is mounted on rails 154 provided on the carriage, and this slide is adapted to reciprocate independently of the carriage. Two rods 155 are slidably mounted in the slide 153, and these rods are normally pressed inwardly by coil springs 156. The inner ends of these rods are provided with fingers 157, which are adapted to engage the lugs 150 and 152, as clearly illustrated in Fig. 9. The slide 153 is normally maintained in a withdrawn position by means of a coil spring 158, and is forced inwardly into operative position to clamp the blow mold closed, by means of a roller 159 which engages a cam 160. This cam is shown in Fig. 5, and the layout of the cam is shown in Fig. 15. It may be mentioned here that the cam 160 need not be accurately fitted, for it will be designed to overact, and the necessary lost motion will be taken care of by the springs 156. In operation, the cam 148 will, at the proper instant, move radially inward the carriage 113 and the blow mold unit carried thereby; the trip 137 will release the spring latch 134, thereby permitting the spring 130 to close the blow mold; and just as the blow mold closes the cam 160 will coact with the roller 159, thereby forcing the slide 153 inwardly and bringing the fingers 157 into engagement with the lugs 150 and 152 to tightly clamp together the blow mold halves during the blowing operation. It will be noted that the lugs 150 and 152 are in different planes; and therefore in order that the fingers 157 may engage the lugs, the fingers are of sufficient height to reach the upper lug. Of course, the same purpose would be answered by extending one of the lugs into the plane of the other lug. Both lugs would then be in the plane of the fingers 157. When the blowing operation has been completed the cam 160 will release the roller 159, thereby permitting the spring 158 to move the slide radially outward to release the fingers 157 from the lugs 150 and 152; and at about the same instant the roller 147 will engage the cam 148, whereby the carriage 113 and the blow mold unit carried thereby will be moved radially outward; after which the turret will be rotated to swing the blow mold unit to an outside or delivery position, as described hereinbefore.

The only structure that remains to be described is the means for raising and lowering the blow mold bottom, and the means for properly aligning the blow mold bottom. Numeral 161 refers to the blow mold bottom, which is mounted in a holder 162, pivotally attached to a lug 163 which is integral with or attached to the turret 118. The mold bottom has a loose connection vertically with the holder, so that the beveled groove in the blow mold may cooperate with the beveled edges of the mold bottom, to wedge these parts tightly together. The mold bottom is normally retained in a horizontal position by means of a leaf spring 164; and it may be mentioned here that the mold bottom remains in a horizontal position during the entire cycle of operation, except when it is tripped downwardly twice, and is immediately allowed to spring back into its normal position. The mold bottom is tripped downwardly just prior to receiving the parison and then springs upwardly against the bottom of the depending parison. For the purpose of tripping the mold bottom downwardly at this position, I provide a bell-crank lever 165, the free arm of which carries a roller 166. A rod 167 is pivotally connected to the other arm of the bell-crank lever, and this rod is normally forced inwardly by a coil spring 168, whereby the free end of the bell-crank lever is normally maintained in its upper position. The bottom mold holder 162 is provided with a lip 169, which projects beneath the roller 166 when the blow mold is moved radially inward. Roller 166 is moved downwardly by means of a cam 170 fixed on the column 3 and which is engaged by a roller 171 on the inner end of the rod. By reference to Fig. 17 it will be noted that the cam 170 is so designed that it will permit the rod to almost immediately move in the opposite direction under the pressure of spring 168, whereupon the spring 164 forces the mold bottom upwardly beneath the suspended parison. The other point at which the mold bottom is tripped, is after the blow mold unit has been moved outwardly, has been rotated outwardly, and the article has been completed and the blow mold opened, ready to deliver the article. At this point the lip 169 rides under a trip cam 172, whereby the mold bottom is tilted downward, so that the bottle or other article will fall upon a chute, or will be received by other appropriate receiving means. The layout of cam 172 is shown in Fig. 15. As soon as the article has been delivered the mold bottom will be caused to spring back into its normal horizontal position, by means of leaf spring 164.

The means for aligning the blow mold right and left (looking toward the center of the machine) has already been described, and I shall now describe the means for aligning the blow mold radially. It will be understood that the blow mold clamps about the mold bottom, and therefore, if the mold bottom is accurately centered radially, the blow mold will necessarily be accurately centered radially; so that there will be true alignment between the neck mold and blow mold. With this purpose in view, I provide the mold bottom holder 162 with two parallel arms 173, in the ends of which are mounted set screws 174. A registering plate for aligning the mold bottom is indicated by numeral 175, and this plate is mounted for reciprocable movement in the main frame 10. The registering plate is attached to a rod 176, and a coil spring 177 presses the end of the rod, which is provided with a roller 178, against a fixed cam 179 mounted on the central column 3. This cam is shown in Fig. 2, and the layout of the cam is shown in Fig. 18. The cam is so designed that just after the mold bottom springs up beneath the downwardly stretching parison, the cam will force the registering plate outwardly to a fixed radial position as determined by the cam; and this registering plate by engagement with the set screws 174 on the arms 173 will likewise move the mold bottom plate out to a fixed radial position, which position will be a true center, in and out, with respect to the neck mold. And as the position of the blow mold is determined by closing about the mold bottom, it obviously follows that the blow mold will be truly centered, in and out, with respect to the neck mold. It will be understood that during the blowing action cam 160 coacting with roller 159 will be trying to force the blow mold farther inward, and this will maintain the set screws firmly against the registering plate 175; and the overacting by the cam 160 will be taken care of by the springs 156. It will also be understood that wear on the rollers 178 and cam 179, may be taken care of by adjustment of the set screws 174.

Having fully described the construction of the forming machine, and having given a more or less general description of the operation thereof; I shall now give a detailed description of a complete cycle of operation, from the time the charge is fed to the inverted blank mold until the completed article is discharged. In the following description of the operation reference will be made to various stations or positions, and these stations or positions will be indicated by letters; but it is to be understood that these stations or positions are given largely for the purpose of aiding in the description, and not with any idea that the various steps must be performed at the points indicated. And it will also be understood that the term station is not used in its true sense, for this machine preferably rotates continuously, as distinguished from the well known intermittently rotated forming machines, in which the machine comes to a stop while each operation is being performed, and which stops are properly termed stations.

The description of the operation will begin with the charging station, and the operation of the blow mold at this time will not be described, as the operation of the blow mold, in this part of the cycle, will more naturally follow the description of the blowing of the article. Let it be assumed that the blow mold has been moved radially outward, that the neck mold is inverted and closed, being aligned by the index pin 41, that the blank mold is inverted and closed about the neck mold, and that the plunger has been projected into the neck mold in cooling position, and that this inverted blank mold unit is just passing beneath the feeder which will deliver a charge of glass thereto, this position being indicated by reference letter A.

Just before station A is reached, the bottom baffle blow plate 42 has started to move toward its position over the blank mold, by reason of the cam 58 coacting with the roller 57; and at about the point B the plate 42 will be directly over the parison mold and at this point the pin (or roller) 51 will engage the cam 52, whereby the plate 42 will be forced downwardly into engagement with the end of the blank mold; the plate being guided into position by the beveled edge 54 thereof cooperating with the beveled edge 55 of the projection on the blank mold. The blank mold halves have been firmly clamped together by the cam 29 cooperating with the roller 28, and at about the point indicated by station C a short blast of air passes through port 102 of the manifold face 101, to the pipe 109, thence to the air chamber of the plate 42, where it will unseat the check valve 45 and enter the upper end of the blank mold to compact the glass downwardly in the neck mold. The plunger nose 73 is at this time in cooling position, by reason of the fact that the roller 82 is traveling on the higher level of the cam 83. As indicated in Fig. 7, when the plunger nose is in cooling position the air does not enter the blank mold, but merely enters the interior of the nose and then reverses its direction and passes downwardly around the tubular member and escapes to the atmosphere through the ports 85. It will be noted by reference to Fig. 20 that the pipe 110 is registering with slot 103, so that the plunger nose is cooled both before and during the compacting operation. As described hereinbefore this air passes through port 103 to pipe 110, to the interior of the barrel 22, to the interior 111 of the rod 20, to the pipe 112 to the passage 67 of the rod 65, to the tubular member 75, to the nose 74, and then downwardly around the tubular member to the ports 85, where it escapes to the atmosphere.

The downward compacting blast is short, being cut off at approximately station D, by reason of pipe 109 passing out of register with the port 102 of the air manifold. The continued rotation of the table brings the roller to the downstep 86 of the cam 83, so that the roller rides down onto the lower step 87 of this cam 83, thereby moving the plunger from cooling position to blowing position. This movement of the plunger from cooling position to blowing position occurs at about station E. Of course, the pipe 110 is still registering with the port 103, so that the supply of air will continue through pipe 110, but instead of exhausting to the atmosphere through ports 85, it passes through ports 88 and then through the passage 91 surrounding the plunger, to the interior of the parison, where it will blow the parison to form against the wall of the blank mold and against the bottom plate 42; the short compacting blast having been dissipated in the meantime. The blowing of the parison is continued to about the position F, where the air is shut off by reason of pipe 110 passing out of register with the port 103 in the air manifold. The parison is now formed, and the next few steps pertain to getting the parison into position for transfer to the blow mold, where the article is blown to its final form.

At about the position G the pin 51 rides free of the cam 52, permitting the bottom baffle blow plate to be forced upward by the spring 48, out of engagement with the blank mold. The plate is then swung laterally by the roller 57 coacting with the other cam 58, and the plate is maintained in its inoperative position, after the roller leaves the cam, by reason of the spring latch 62 engaging one of the notches 60. Also at about position G the roller 82 rides off the lower step 87 of the cam 83, thereby permitting the spring 66 to move the plunger blowhead downwardly out of the neck mold. Between stations G and H the guide lug 96 passes free of the cam 97 which prevented the blank mold unit from being rotated, and at the same time the bevel gear 93 carried by the turnover casting 12 engages the rack 95, whereby the turnover unit is rotated through 180° to bring the blank mold into neck-up position, together with the neck mold and plunger blowhead; and just as the gear 93 passes out of mesh with the rack 95, the guide lug 96 comes into engagement with the cam 98, to retain the blank mold unit in approximately its vertical position. Thus it is seen that at about position H the blank mold unit is in neck-up position ready for the necessary steps to be performed to transfer the parison from the blank mold to the blow mold. In the meantime, however, the blow mold has started to come into action. After the blow mold discharged the finished article, the gear 139 of the turret 118, came into mesh with the rack 141, between the stations E and F, and thereby rotated the blow mold unit 180° about a vertical axis, to bring the blow mold unit into position facing inward, but still remaining in its outer position radially. The blow mold is retained open by the latch 134 engaging a notch in the crosshead 127; but if the blow mold should have closed accidentally it will be opened by means of the roller 132 engaging the cam 136. During all this the blow mold unit has remained in its outer radial position, by reason of the roller 147 riding in the cam 148; but between stations G and H, the cam 148 is so designed that it will move the blow mold unit bodily toward the center of the machine, to its inner radial position. So that at about position H the blow mold is open, facing inward, and is in its inner position radially, ready to close about the parison; and the neck mold and blank mold are in neck-up position and closed.

Between stations H and J, the roller 27 cooperating with the cam 30, opens the blank mold, leaving the parison suspended from the neck mold. The blow mold bottom has been swung downward by the cam 170 moving the rod 167 outwardly thereby moving downwardly the free end of the bell-crank lever 165 which is in engagement with the lip 169 on the blow mold bottom holder 162; and just after the blank mold is opened this cam 170 releases the rod 167, whereby its spring 168 moves it inwardly, and the leaf spring 164 snaps the blow mold bottom upwardly into horizontal position beneath the depending parison. At about this instant the cam 179 moves the registering plate outward to a fixed position, to center the blow mold bottom radially, as hereinbefore described. At about the same time, the trip 137 releases the spring latch 134, which permits the spring to snap the blow mold closed about the parison; the blow mold being centered right and left (looking toward the center of the machine) by means of the index lug 138. And at about the same time the roller 147 rides free of the cam 148, and the roller 159 engages the cam 160, whereby the fingers 157 engage the lugs 150 and 152, to clamp the blow mold tightly shut during the blowing operation; the overaction of the cam 160 being taken care of by the springs 156. And it will be understood that the registering plate 175 in moving the blow mold bottom slightly outward radially to true center position, acts against these springs 156. The neck mold has remained aligned by the index pin 41, the blow mold, in closing, is aligned right and left by the index lug 138, the blow mold bottom is centered radially with respect to the neck mold in the manner hereinbefore described, and as the blow mold embraces the blow mold bottom, the blow mold will necessarily be centered with respect to the neck mold, and the beveled cooperating edges of the blow mold and blow mold bottom, cause the mold and bottom to be clamped together in tight fitting relation. So that at about position J the blank mold is open, the parison is within the blow mold, and this mold is clamped tightly shut, and properly aligned with the neck mold. At this point I will temporarily leave the description of the blank mold unit, and will continue on with the description of the blow mold unit to the completion and delivery of the article; and will then return to complete the description of the blank mold unit from position J to position A, which was the starting point of the cycle of operation.

The blow mold is ready for the blowing operation at about position J, and at about this point the roller 82 of the plunger blowhead comes into engagement with the cam 92, whereby the blowhead is moved downward into blowing position in the neck mold, and blowing air is admitted to the interior of the parison to blow the article to final form, by reason of pipe 110 registering with the port 104 in the air manifold 100. The blowing of the article in the blow mold continues until about position K, at which point the pipe 110 passes out of register with the port 104. At just about position K the roller 82 passes free of the cam 92 thereby permitting the spring 66 to throw the plunger blowhead upwardly into inoperative position free of the neck mold; and at about the same instant the neck mold is opened by the roller 39 coacting with the cam 40. Thus the blow mold, with the article in it, is now free to move radially away from the center of the machine. At about this point the registering plate is moved inwardly toward the center of the machine by spring 177, the roller 159 rides free of the cam 160, thereby relieving the clamping pressure on the blow mold, but the blow mold being retained closed by the spring 130; and roller 147 then engages cam 148 which moves the blow mold radially outward. The blow mold preferably remains in this position until a point beyond station A is reached, where the gear 139 of the turret engages the rack 140, whereby the spring latch 145 is forced out of its locking notch 144, and the turret and blow mold unit is swung 180° to a convenient delivery position; the spring latch now engaging the other notch 144 to releasably lock the blow mold unit in this position. At about position D the blow mold is snapped open by the roller 132 engaging the cam 133, and is retained open by the spring latch 134 engaging a notch in the crosshead 127; and just after the blow mold is opened the blow mold bottom is snapped downward by the lip 169 passing under the trip cam 172. This tilting of the mold bottom discharges the formed article into a chute or upon a mechanical conveyer, as desired. Of course, this tilting of the mold bottom may be omitted, and a mechanical take-out may be employed for removing the finished ware. As the blow mold continues on, the lip 169 passes free of the trip cam 172, whereupon the leaf spring 164 snaps the mold bottom up into its normal horizontal position. The blow mold unit is now ready to be rotated 180° in the opposite direction by the rack 141 and then be moved radially inward by the cam 148, etc., thereby repeating another cycle of operation, exactly as described above.

A complete cycle of operation of the blow mold units has been described, but the description of the blank mold units was left temporarily at position J, just after the blank mold had been opened and the parison transferred to the blow mold. Returning now to complete the description of the operation of the blank mold unit; the blank mold was opened between stations J and H, by the roller 27 cooperating with the cam 30; and the blank mold remains in this position until station L is almost reached. In the meantime the plunger blowhead has passed free of the cam 92, whereby the spring 66 moved the plunger upwardly out of the neck mold; and the neck mold has been opened by cam 40 to permit the blow mold to move outwardly with the blown article. The cam 40 is very short, so that the neck mold quickly snaps closed again. The blank mold unit is now ready to be rotated 180° to its inverted position, and at about position L the guide lug 96 passes free of the cam 98, and the bevel gear 93 carried by the turnover casting 12 immediately engages the rack 94, whereby the blank mold unit is in its inverted position prior to reaching station A, and just as the unit is in its inverted position the gear 93 passes out of mesh with the rack 94, and the guide lug 96 engages the cam 97, whereby it is retained in approximately its desired position. Also at about position L the cooperation of cam 29 and roller 28 caused the blank mold to be firmly closed about the neck mold; the spring 23 taking care of the overaction of cam 29. Thus before reaching station A the blank mold unit has been inverted, and the neck mold and blank mold are tightly closed. Just before station A is reached the roller 82 rides up on the cam 83, whereby the plunger blowhead is inserted in the neck mold, in cooling position. The blank mold unit is now ready to repeat the cycle, another charge of glass is fed to the inverted mold at station A, the bottom baffle blow plate is swung over and moved downward into engagement with the blank mold, a short blast of air is admitted to the upper end of the blank mold to compact the glass in the neck mold, etc., and the entire cycle of operation is repeated, as described hereinbefore.

It is believed the construction and operation of the complete machine will be clearly understood from the foregoing description. And while I have described the construction and operation in detail, it will be understood that the invention is subject to many changes and modifications (both as to construction and operation, all of which changes and modifications I aim to include within the scope of the appended claims.

Having fully described the invention, what I now claim is:

1. A glass forming machine including a revolvable table, a plurality of blow mold units and invertible blank mold units carried by said table, and means controlled by movement of the table to relatively move the blow mold units and blank mold units radially in a substantially horizontal plane.

2. A glass forming machine including a revolvable table a plurality of blow mold units and invertible blank mold units carried by said table, and means controlled by the movement of the table to move the blow mold radially in a substantially horizontal plane toward and from the blank mold.

3. A glass forming machine including a continuously revolving table, a plurality of blank mold units and blow mold units carried by said table, means for moving a blow mold unit radially in substantially a horizontal plane away from a blank mold unit, and means for rotating a blow mold unit about an individual vertical axis.

4. A glass forming machine including a revolvable table, an invertible blank mold unit and a blow mold unit carried by said table, means for radially moving the blow mold unit toward the blank mold unit, means for closing the blow mold about a parison, means for blowing the parison to the form of the article, means for moving the blow mold with the article therein radially in a substantially horizontal plane away from the blank mold, and means for opening the blow mold.

5. A glass forming machine including a revolvable table, an invertible blank mold unit and a blow mold unit carried by said table, means for radially moving the blow mold unit in a substantially horizontal plane toward the blank mold unit, means for closing the blow mold about a parison, means for blowing the parison to the form of the article, means for rotating the blow mold, with the article therein, about a vertical axis other than the table axis, and means for opening the blow mold.

6. A glass forming machine including a continuously revolving table, a blank mold unit and a blow mold unit carried by said table, means for radially moving the blow mold unit toward the blank mold unit, means for closing the blow mold about a parison, means for blowing the parison to the form of the article, means for moving the blow mold, with the article therein, away from the blank mold, means for rotating the blow mold about a vertical axis other than the machine axis, and means for opening the blow mold.

7. A glass forming machine including a revolvable table, a blank mold unit and a blow mold unit mounted on said table, said blank mold unit comprising a blank mold, a blowhead and a bottom baffle blow plate, means for rotating the blank mold and the blowhead about a horizontal axis, said blow mold unit comprising a blow mold and blow mold bottom, means for moving the blow mold unit radially of the table, and means for rotating the blow mold unit about a vertical axis.

8. A glass forming machine including a revolvable table, an invertible blank mold unit and a blow mold unit carried by said table, said blow mold unit comprising a blow mold and a blow mold bottom, means for moving the blow mold unit radially inward into cooperative relation with respect to the blank mold unit, and means controlled by the movement of the table for tilting the blow mold bottom downwardly and permitting it to snap upwardly beneath a suspended parison.

9. A glass forming machine including a revolvable table, an invertible blank mold unit and a blow mold unit mounted on said table, said blow mold unit comprising a blow mold and a blow mold bottom, means controlled by the movement of the table to tilt the blow mold bottom downwardly and permitting it to snap upwardly beneath a parison, means for rotating the blow mold unit about a vertical axis, and means for tilting the blow mold bottom downwardly to discharge the article.

10. A glass forming machine including a continuously revolving table, a blank mold unit and a blow mold unit mounted on said table, means for rotating the blow mold unit about a vertical axis to face inwardly or outwardly, and means for tilting the blow mold bottom downwardly and permitting it to snap upwardly while the blow mold is facing inwardly.

11. A glass forming machine including a continuously revolving table, a blank mold unit and a blow mold unit mounted on said table, means for rotating the blow mold unit independently of the blank mold unit about a vertical axis to face inwardly or outwardly, and means for tilting the blow mold bottom downwardly when it is in either of such positions.

12. A glass forming machine including a continuously revolving table, a blank mold unit and a blow mold unit mounted on said table, means for rotating the blow mold unit independently of the blank mold unit about a vertical axis to face inwardly or outwardly, means for closing the blow mold while facing inwardly and means for opening the blow mold while facing outward.

13. A glass forming machine including a continuously revolving table, a blank mold unit and a blow mold unit mounted on said table, said blank mold unit including a blank mold and a blowhead, means for rotating the blank mold about a horizontal axis to neck-up position, and means for rotating the blow mold unit independently of the blank mold unit about a vertical axis.

14. A glass forming machine including a revolvable table, a blank mold unit mounted on said table and including a blank mold, neck mold, and combined plunger blowhead, means for moving the plunger blowhead into the neck mold in cooling position, and means for moving the plunger blowhead in the neck mold into blowing position.

15. A glass forming machine including a revolvable table, a blank mold unit and a blow mold unit mounted on said table, a plunger blowhead adapted to cooperate with the blank mold and blow mold, means for moving the plunger blowhead into cooling position, means for moving the plunger blowhead into blowing position, means for rotating the blank mold unit to neck-up position, means for opening the blank mold and closing the blow mold about the parison, and means for moving the plunger blowhead into blowing position with respect to the blow mold.

16. A glass forming machine including a blank mold and neck mold mounted on a revolvable table, a plunger blowhead, a cam controlling the movements of the plunger blowhead in the neck mold first to cooling position and then to blowing position.

17. A glass forming machine including a blank mold unit mounted on a revolvable table, said blank mold unit including a blank mold, neck mold, and plunger blowhead, means for projecting the plunger blowhead into the neck mold and exhausting to the atmosphere the air supplied to the blowhead, and means for slightly withdrawing the plunger blowhead to a position where the air supplied will enter the blank mold.

18. A glass forming machine including a rotatable table, a plurality of blank mold units comprising blank molds and neck molds carried by said table, a plurality of blow mold units carried by said table, means for moving the blow mold units radially in substantially a horizontal plane toward and from the blank mold units, and means carried by the blank mold units for aligning the blow molds.

19. A glass forming machine including a rotatable table, a plurality of blank mold units and blow mold units carried by said table, means for moving the blow mold units radially in substantially a horizontal plane, and means for automatically centering the blow mold bottoms radially of the table, and means for closing the blow molds about the blow mold bottoms.

20. A glass forming machine including a rotatable table, a plurality of blank mold units and blow mold units carried by said table, and a reciprocable rod controlled by the movement of the table for automatically centering the blow mold bottoms radially of the table.

21. A glass forming machine including a rotatable table, forming units including neck molds and mold bottoms mounted on said table, and a reciprocable rod controlled by the table for moving the mold bottoms radially of the table, in a substantially horizontal plane to true centered position with respect to the neck molds.

22. A glass forming machine including a rotatable table, forming units including mold bottoms rotatably mounted on said table and radially movable, registering plates, and means for moving said registering plates for centering the mold bottoms.

23. A glass forming machine including a rotatable table, forming units including mold bottoms rotatably mounted on said table and radially movable, registering plates for centering the mold bottoms, and a cam for operating the registering plates.

24. A glass forming machine including a rotatable table, forming units including mold bottoms rotatably mounted on said table and radially movable, registering plates for moving the mold bottoms to centered position, and springs opposing the movement of the mold bottoms.

25. A glass forming machine including a rotatable table, forming units including mold bottom holders rotatably mounted on said table and radially movable, a pair of parallel arms projecting from said holders, and means for engaging said arms and moving the holders to centered position.

26. A glass forming machine including a rotatable table, forming units including mold bottom holders rotatably mounted on said table and radially movable, a member projecting from each of said bottom holders, and means for engaging said members for moving the holders to centered position, the effective length of said members being adjustable.

27. A glass forming machine including a rotatable table, an invertible blank mold unit and a blow mold unit carried by said table, a cam for moving the blow mold unit radially inward in substantially a horizontal plane, and a cam for clamping the blow mold closed.

28. A glass forming machine including a rotatable table, a radially movable carriage mounted on said table, a blow mold rotatably mounted on said carriage, a member slidably mounted on said carriage, and means for moving said member to clamp the blow mold shut.

29. A glass forming machine including a rotatable table, a blow mold unit rotatably mounted on said table, means for moving the blow mold unit radially of the table, lugs operatively connected with the blow mold halves, and means controlled by movement of the table to engage said lugs to clamp the blow mold shut.

30. A glass forming machine including a rotatable table, a vertical turret mounted for radial movement on said table, blow mold halves carried by the turret, means for rotating the turret, means for moving the turret radially inward, and means for clamping shut the blow mold halves.

31. A glass forming machine including a rotatable table, a vertical turret slidably mounted on said table, a blow mold carried by the turret, a rod extending through said turret and connected with one of the blow mold halves, a sleeve extending through said turret and connected with the other blow mold half, lugs operatively connected with the lower ends of the rod and shaft, and cam operated means for engaging said lugs to clamp the blow mold shut.

32. A glass forming machine including a continuously revolving table, a carriage mounted for radial sliding movement on the table, a member mounted on the carriage and connected with a blow mold half, a second member mounted on the carriage and connected with another blow mold half, a slide mounted on said carriage and adapted to cooperate with said members to clamp the blow mold shut, and a cam for operating the slide in one direction.

33. A glass forming machine including a continuously revolving table, a carriage mounted on said table to move radially thereof, a vertical turret mounted on said carriage, a cam for moving the carriage radially of the table, a rod extending through said turret and operatively connected at its upper end with a blow mold half, a sleeve extending through said turret and operatively connected at its upper end with a blow mold half, lugs operatively connected with the lower ends of said rod and sleeve, a slide mounted on said carriage, spring pressed fingers carried by said slide, and means to move said slide to cause the spring pressed fingers to engage the said lugs.

34. A glass forming machine including a continuously revolving table, a carriage mounted on said table to move radially thereof, a vertical turret mounted on said carriage, a gear connected with the turret, a rack adapted to be engaged by said gear to rotate the turret, a rod extending through said turret, a blow mold half operatively connected with the upper end of said rod, a roller on the lower end of said rod, a cam adapted to engage said rod to move the carriage and turret radially inward, a sleeve extending through said turret, a blow mold half operatively connected with the upper end of said sleeve, lugs associated with the lower ends of the rod and sleeve, a slide mounted on said carriage, spring pressed fingers mounted on said slide and adapted to engage said lugs, and a cam for moving said slide inwardly independently of the carriage.

WALTER M. CRILE.